United States Patent
Fischer et al.

(10) Patent No.: US 7,311,014 B2
(45) Date of Patent: Dec. 25, 2007

(54) SENSOR AND SENSOR ASSEMBLY

(75) Inventors: Thomas Fischer, Berlin (DE); Wolfgang Grundmann, Birkenwerder (DE); Klaus Herrmann, Berlin (DE)

(73) Assignee: Epcos AG, Munich (DE)

( * ) Notice: Subject to any disclaimer, the term of this patent is extended or adjusted under 35 U.S.C. 154(b) by 3 days.

(21) Appl. No.: 10/495,837

(22) PCT Filed: Nov. 14, 2002

(86) PCT No.: PCT/DE02/04222

§ 371 (c)(1), (2), (4) Date: Aug. 23, 2004

(87) PCT Pub. No.: WO03/046496

PCT Pub. Date: Jun. 5, 2003

(65) Prior Publication Data

US 2004/0264544 A1 Dec. 30, 2004

(30) Foreign Application Priority Data

Nov. 19, 2001 (DE) ................................ 101 56 753

(51) Int. Cl.
*G01D 7/02* (2006.01)
(52) U.S. Cl. ............... 73/866.1; 439/389; 439/391; 439/395; 439/404; 439/405; 439/406; 374/208
(58) Field of Classification Search ............... 73/866.1; 439/389, 391, 395, 404, 405, 406
See application file for complete search history.

(56) References Cited

U.S. PATENT DOCUMENTS

| | | | | |
|---|---|---|---|---|
| 4,311,356 A | * | 1/1982 | Levitt .......................... | 439/405 |
| 4,375,071 A | * | 2/1983 | Crowley et al. ............ | 360/240 |
| 4,678,867 A | * | 7/1987 | Bongard et al. ............. | 174/135 |
| 4,942,764 A | * | 7/1990 | Dews et al. .................. | 73/301 |
| 5,244,409 A | * | 9/1993 | Guss et al. .................. | 439/490 |
| 5,277,616 A | | 1/1994 | Harting et al. | |

(Continued)

FOREIGN PATENT DOCUMENTS

DE    93 02 765.6    5/1993

(Continued)

OTHER PUBLICATIONS

German Examination Report for Application No. 10156753.7.

*Primary Examiner*—Hezron Williams
*Assistant Examiner*—Samir M. Shah
(74) *Attorney, Agent, or Firm*—Fish & Richardson P.C.

(57) ABSTRACT

The invention relates to a sensor comprising a sensor element (1) for detecting a physical variable, said sensor comprising two electric contact surfaces (2), and comprising a sensor body (3), on one end of which the sensor element (1) and on the other end of which a contact carrier (4) is located, wherein the contact carrier (4) supports at least two insulation displacement contacts (5) suitable for producing an insulation displacement connection (6) to an electric connecting cable (7), wherein each contact surface (2) is connected to an insulation displacement contact (5). The invention also relates to a sensor assembly. The combination of the insulation displacement technology with the sensor makes it possible for the sensor and the cable tree of a motor vehicle, for example, to be contacted in a simple manner.

20 Claims, 5 Drawing Sheets

U.S. PATENT DOCUMENTS

| | | | |
|---|---|---|---|
| 5,342,126 A | | 8/1994 | Heston et al. |
| 5,611,709 A | * | 3/1997 | McAnulty .................. 439/422 |
| 5,644,093 A | * | 7/1997 | Wright et al. .............. 73/866.5 |
| 5,761,052 A | * | 6/1998 | Wheeler-King et al. .... 361/803 |
| 5,997,344 A | * | 12/1999 | Shinozaki ................... 439/489 |
| 6,371,796 B2 | * | 4/2002 | Fukuda ....................... 439/489 |

FOREIGN PATENT DOCUMENTS

| | | |
|---|---|---|
| DE | 42 03 455 | 6/1993 |
| DE | 93 10 650.5 | 10/1993 |
| DE | 93 11 223.8 | 10/1993 |
| DE | 44 32 274 | 3/1996 |
| DE | 198 04 170 | 8/1999 |
| DE | 100 06 143 | 8/2001 |
| EP | 0 866 519 | 9/1998 |
| GB | 2 207 509 | 2/1989 |

* cited by examiner

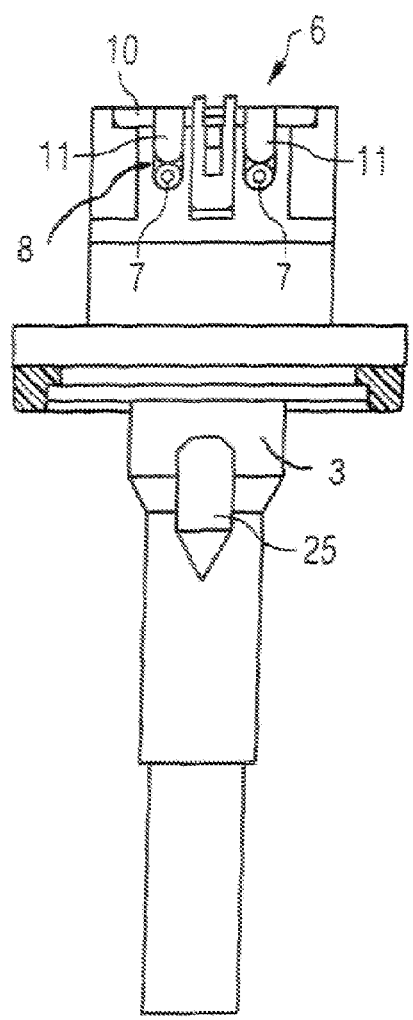
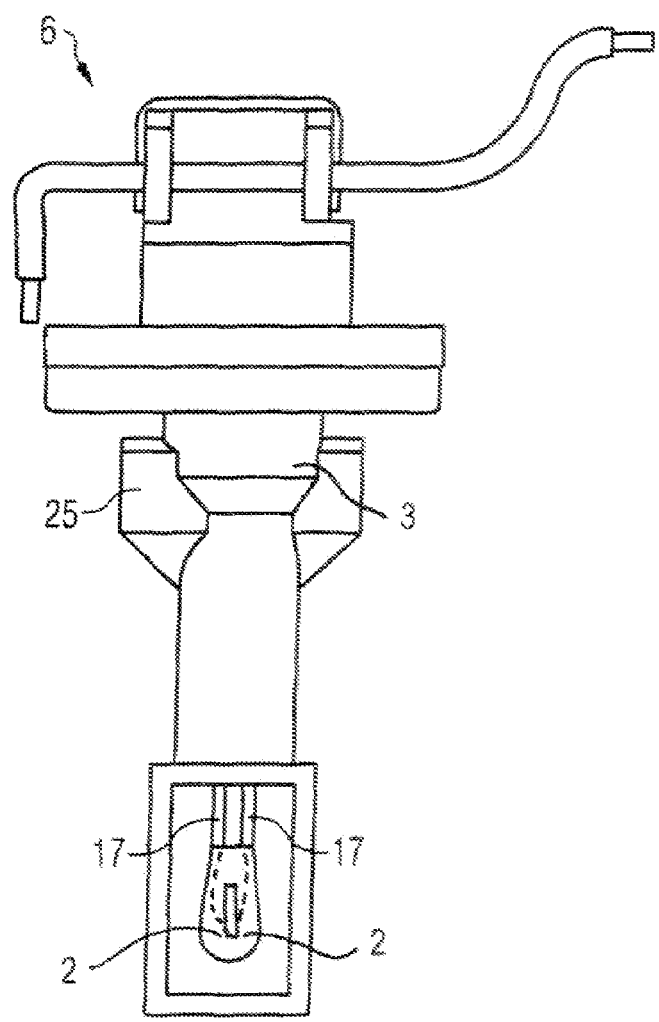

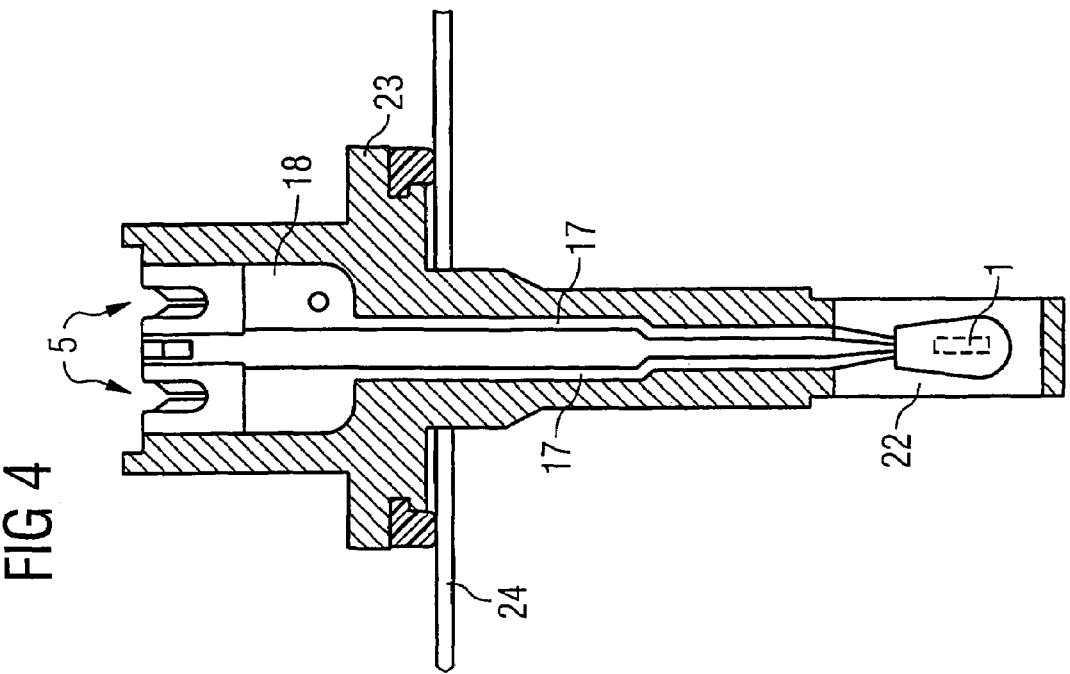
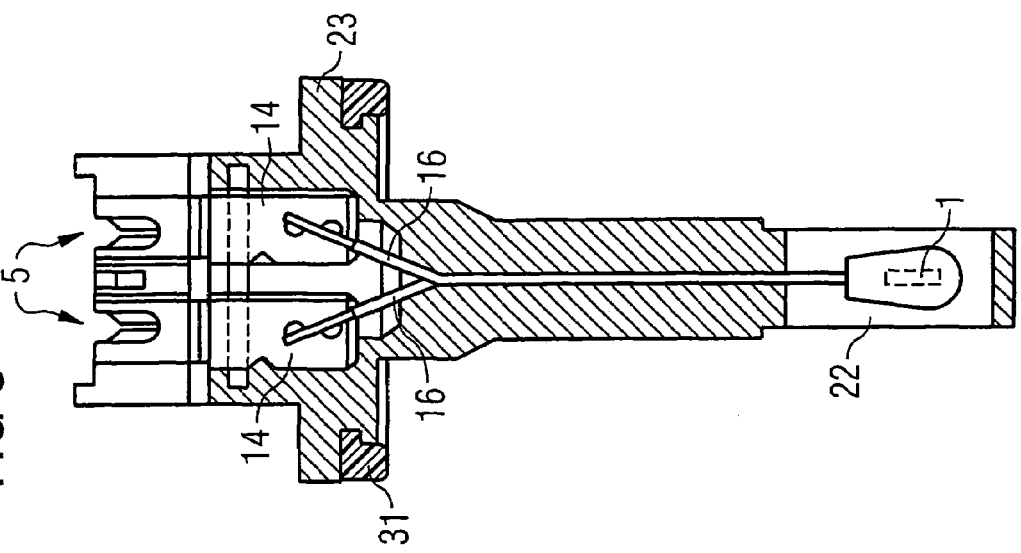

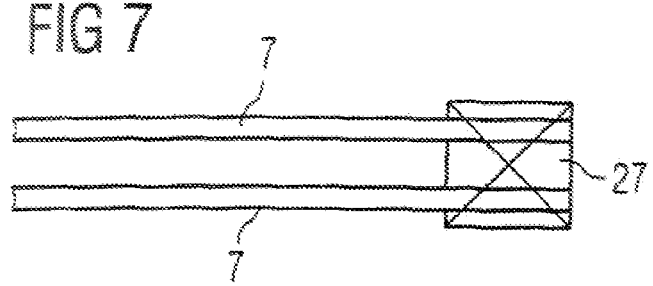
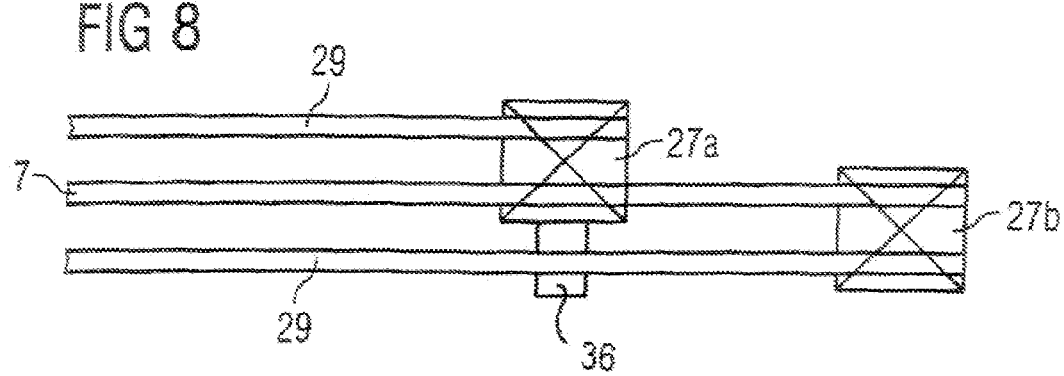
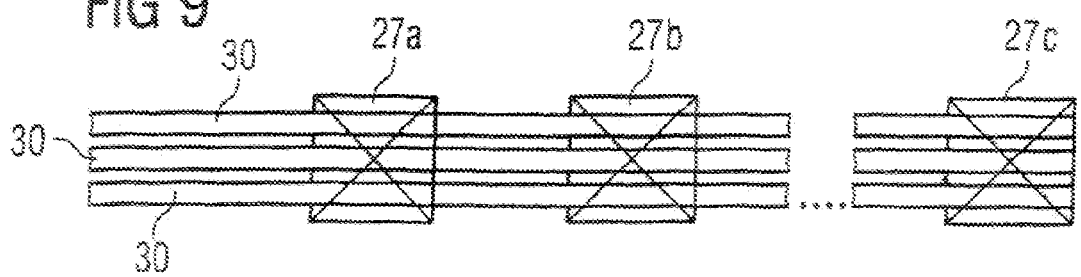

SENSOR AND SENSOR ASSEMBLY

TECHNICAL FIELD

This patent application describes a sensor comprising a sensor element for detecting a physical variable, where the sensor is in a sensor body. This patent application also describes a sensor assembly.

BACKGROUND

Sensors may be used to measure temperatures in the automotive industry. Sensors may be integrated into the electronic system of a motor vehicle during the course of production.

Some sensors have a permanently mounted connecting cable located at the sensor. These connecting cables may be woven into a cable tree in the motor vehicle. Some sensors contact cables in a motor vehicle via a plug and receptacle. The plug is mounted on the sensor and the receptacle is mounted in a corresponding cable of the cable tree.

SUMMARY

A sensor is described that comprises a sensor element for detecting a physical variable. The sensor element comprises two electric contact surfaces. The sensor element also comprises a sensor body, on one end of which the sensor element is located and on the other end of which a contact carrier is located. The contact carrier supports at least two insulation displacement contacts for producing an insulation displacement connection to an electric connecting cable. Each contact surface is connected to an insulation displacement contact.

The combination of a sensor with the possibility of using the insulation displacement technology for contacting with an electric connecting cable enables an existing cable to be electrically contacted with the sensor relatively easily. A particular advantage of the insulation displacement technology is that the cable to be contacted with the sensor or the electric connecting cable to be contacted with the sensor can pass through the insulation displacement contacts of the sensor, so that serial contacting of the cable with multiple sensors or other components can be easily obtained.

In addition, a sensor assembly is described in which each insulation displacement contact of the sensor is connected to an electric connecting cable.

In addition, a sensor assembly is described that comprises a plurality of sensors, where each such sensor is structured as described above. In this process, one insulation displacement contact of each sensor is connected to one and the same electric connecting cable. The individual insulation displacement contacts of the sensors are, in a sense, connected in series to one and the same electric connecting cable. As a result, for example, a shared supply or return cable or a shared cathode or anode for the sensor element can be implemented in the sensor assembly. Each of the remaining insulation displacement contacts is connected to another electric connecting cable. Thus, the return cable of the sensors is executed separately.

As a result of insulation displacement technology, a fork is essentially integrated into the connecting cable to be connected to the sensor. The connecting cable can continue and be connected to other components at other locations.

An advantage of the sensor assembly comprising multiple sensors is that, as a result of connecting sensors in series to a single electric connecting cable, cable material as well as circuitry costs can be saved.

The insulation displacement contacts can, for example, be designed to include recesses in which two opposing blades are disposed. The blades have a sharp edge suitable for cutting the insulation material of an electrically insulated connecting cable and contacting the electrically conductive material under the isolation, such as copper wire.

Accordingly, a sensor assembly is also described in which a connecting cable provided with insulation is inserted into an insulation displacement contact in such a way that the insulation is cut in two by the blades of the insulation displacement contact and the blades contact the electric conductor, such as a copper wire.

The sensor can also comprise a contact lid, which comprises means for pressing an electric connecting cable into the space between two blades of a recess in an insulation displacement contact and, further, means of fastening the connecting cable in the recess of the insulation displacement contact.

Two different functions can be combined via the contact lid. First, the electric connecting cable can be pressed into the recess by playing the lid onto the insulation displacement contact. This establishes the electric contact between the electric connecting cable and the insulation displacement contact. The contact lid also makes it possible to mechanically fasten the connecting cable to the insulation displacement contact and/or the contact carrier.

In an embodiment, the means for pressing an electric connecting cable into the space between two blades can be executed as a pressing fin that projects downward from the contact lid. A possible means of fastening the connecting cable in the recess is, for example, to provide an eye on the contact lid, which latches into a snap hook on the contact carrier. The latching takes place when the contact lid is pushed onto the contact carrier. The insulation displacement contacts can be provided with contact elements that are permanently connected to contact cables disposed on the sensor element.

It is also possible to connect the insulation displacement contacts to the sensor element via electrically conductive connections, wherein the insulation displacement contact and the electrically conductive connections are an integral component of a punched panel. Such a punched panel can be a lead frame, for example.

To protect the insulation displacement contact against moisture, it is advantageous to provide a sealing cap that can be pushed onto the contact carrier.

Protection against moisture can also be achieved by providing both the contact lid and the contact carrier with sealing elements, which can be elastically shaped by mounting the contact lid onto the contact carrier, thereby sealing the insulation displacement contact against moisture.

To improve contact between the sensor element and the medium surrounding the sensor, such as the air, the temperature of which is to be measured, it can be advantageous to locate the sensor element in a hole in the sensor body. As a result, the sensor element is protected on two sides against mechanical damage. The sensor element is freely accessible from the other two sides, so that, for example, air or fluid can flow past it and come into direct contact with it.

The sensor body can also comprise a flange in the region of the contact carrier, which is suitable for mounting the sensor to the wall or in a hole in a wall of a housing. For mounting the sensor, it is also advantageous to provide it with a bayonet catch.

The flange makes it possible to seal the housing, in which the sensor is to be mounted, with the flange.

The bayonet catch allows for simple and secure connection of the sensor to a correspondingly shaped hole in a housing.

Moreover, it is advantageous to provide a bus system in the sensor. The advantage of such a bus system is that it can be connected, via multiple cables, to a corresponding bus monitoring device or bus control device. Several sensors provided with a bus system can be connected to the control device via the single multiple cable. As a result, the complexity of cable installation can be significantly reduced.

Accordingly, a sensor assembly is described which comprises a plurality of sensors, wherein each sensor is provided with an integrated bus system. In addition, a plurality of bus cables are provided, wherein each bus cable is connected to an insulation displacement contact of each sensor. This results in a series connection of a plurality of sensors, all of which can be controlled and/or read through one and the same plurality of bus cables.

In particular, it is no longer necessary to install an extra pair of connecting cables for each sensor.

To further secure the electric connecting cable to be connected to the sensor, it is possible to further the sensor with a contact safety. Such a contact safety can, for example, be disposed on the contact carrier. Suitable for this purpose are, for example, crimps, which can be closed with a special device (such as a pair of crimping pliers). However, it is also possible to provide two simple, straight panels, which are oriented upward on the contact carrier. After the electric connecting cable has been placed into the insulation displacement contact, the panels are folded over, thereby fastening the electric connecting cable. This results in an advantageous relief of tensile stress on the connecting cable.

In the following, embodiments are explained in greater detail with reference to corresponding figures.

DESCRIPTION OF THE DRAWINGS

FIG. 2A shows the sensor from FIG. 1A with the contact lid closed.

FIG. 2B shows the sensor from FIG. 1B with the contact lid closed.

FIG. 3 shows, as an example, another sensor in schematic cross-section.

FIG. 4 shows, as an example, another sensor in schematic cross-section, which is installed into a housing.

FIG. 7 shows, as an example, a first sensor assembly.

FIG. 8 shows, as an example, a further sensor assembly.

FIG. 9 shows, as an example, a further sensor assembly with a bus system.

DETAILED DESCRIPTION

Figure 1A:
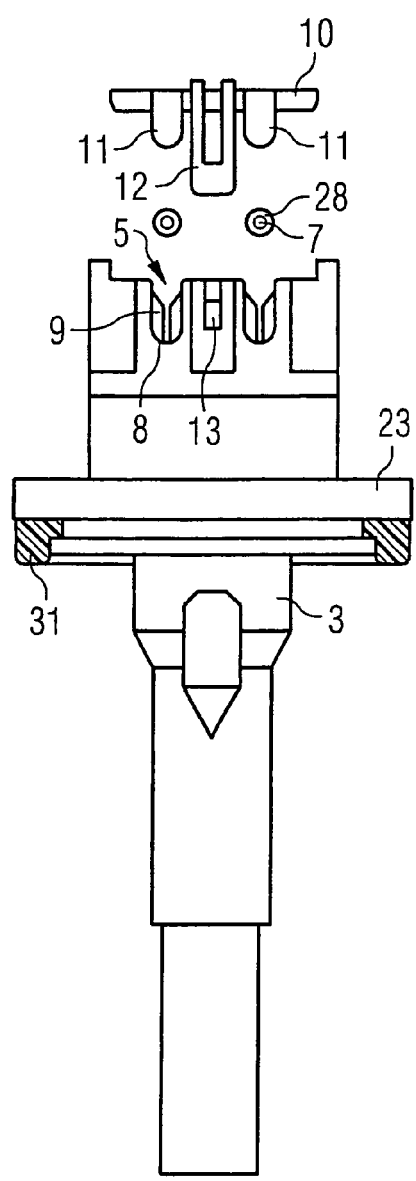
FIG. 1A shows, as an example, a sensor in a first side view.
Figure 1B:
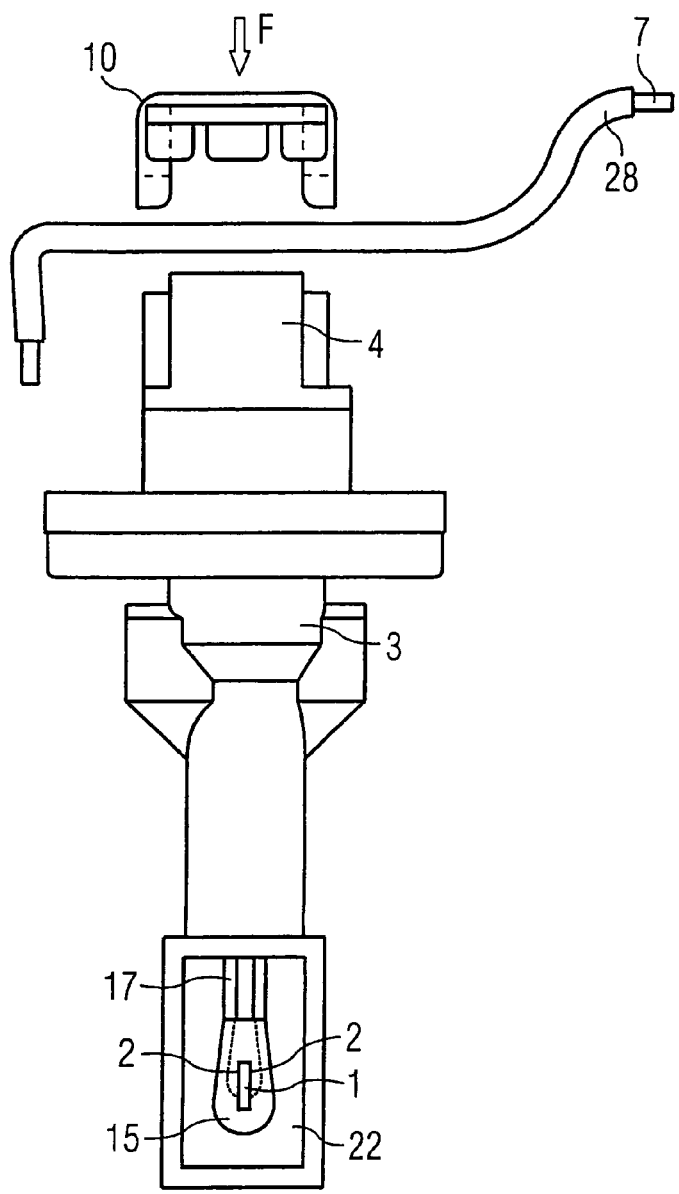
FIG. 1B shows the sensor from FIG. 1A in a second side view.

FIGS. 1A and 1B show a sensor with a sensor body 3, at the lower end of which a sensor element 1 is disposed in a hole 22. The sensor element 1 is used to detect a physical variable and can be designed to measure temperature, for example. The sensor element 1 has contact surfaces 2, at which the sensor element 1 can be electrically contacted through electrically conductive cables 17. The sensor element is encased by a sealing compound 15. At its other end, the sensor body 3 is provided with a contact carrier 4, which supports two insulation displacement contacts 5. Each of the insulation displacement contacts 5 contains a recess 8, within which two opposing blades 9 are disposed.

By inserting an electric connecting cable 7, which is provided with insulation 28, into the recess 8, the insulation 28 can be cut in two by the blades 9 and the electric connecting cable 7 can be contacted. The contact lid 10 is provided with which the electric connecting cable 7, by application of force F, can be pressed into the recesses 8 of the insulation displacement contacts 5. The electric connecting cable 7 is pressed in via pressing fins 11, which are disposed on the contact lid 10.

The contact lid 10 also comprises an eye 12, which can latch into a snap hook 13 of the contact carrier 4. As a result, pushing the contact lid 10 simultaneously causes an electrical and mechanical connection to be established between the electric connecting cable 7 and the sensor.

The sensor also comprises a flange 23, which is provided with a seal 31. As a result, the sensor can also be installed into a housing or into a wall of a housing.

FIGS. 2A and 2B show the sensor from FIGS. 1A and 1B with the contact lid 10 closed. By closing the contact lid 10, an insulation displacement connection 6 can be established, so that the electric connecting cable 7 is connected to the sensor.

Each contact surface 2 is connected to an insulation displacement contact 5 via an electrically conductive connection 17.

The sensor body 3 of the sensor also comprises a bayonet catch 25, which allows for simple and secure connection of the sensor to the wall of a housing.

FIGS. 2A and 2B also indicate how the pressing fins 11 of the contact lid 10 press the electric connecting cable 7 into the recess 8 of the insulation displacement contact 5 (see FIGS. 1A and 1B for displacement contact 5).

FIG. 3 shows a sensor in which the insulation displacement contacts 5 are provided with contact elements 14. The sensor element 1 is provided with contact cables 16, which establish electrical contact between the sensor element 1 and the contact elements 14 and, therefore, with the insulation displacement contacts 5. The contact between the contact cables 16 and the contact elements 14 can be established via soldering or welding, for example.

FIG. 4 shows a sensor that is installed in a housing 24 via the flange 23. The insulation displacement contacts 5 as well as the electrically conductive connections 17 between the insulation displacement contacts 5 and the sensor element 1 are an integral component of a punched panel 18. Such a panel 18 can be a lead frame, for example. The panel 18 is produced by punching, and subsequently the sensor element 1 is electrically connected to the panel 18 via soldering. The sensor element 1 can be an NTC temperature sensor, for example.

Figure 5:
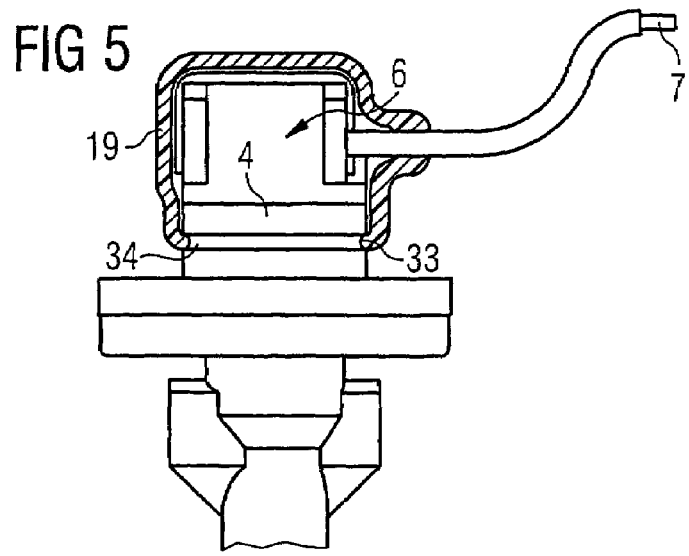
FIG. 5 shows, as an example, another sensor with an outer seal against moisture.

FIG. 5 shows a sensor, which is provided with a sealing cap 19. The sealing cap 19 prevents moisture from penetrating externally into the insulation displacement contact 6. The sealing cap 19 is made of waterproof material. It can comprise rubber, for example. The sealing cap 19 is pushed onto the contact carrier 4 from above. Beads 33 engage a recess 34 in the contact carrier 4, thereby sealing the insulation displacement connection 6. The sealing cap 19 also comprises an opening, through which the electric connecting cable 7 can reach the insulation displacement connection.

An advantage of this type of sensor, which is sealed against moisture, is that it can be used in, e.g., an evaporator of an air-conditioning system.

Figure 6A:
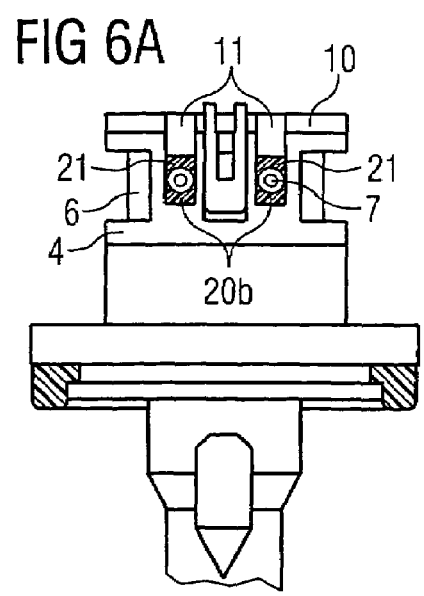
FIG. 6A shows, as an example, another sensor with an inner seal against moisture in a first side view, with the contact lid closed.
Figure 6B:
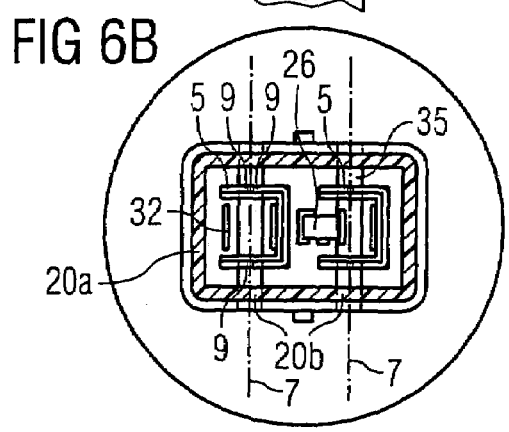
FIG. 6B shows the sensor from FIG. 6A in a top view, with the contact lid open.
Figure 6C:
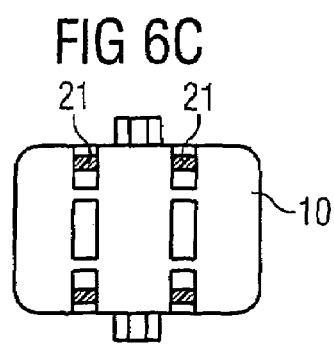
FIG. 6C shows the lid of the sensor from FIG. 6A in a top view.

The sensor can also be provided with an interior seal. Such an interior seal is depicted in FIGS. 6A to 6C. FIG. 6A shows a sensor with a closed contact lid 10, corresponding to FIG. 2A. Sealing elements 21 of the contact lid 10 are disposed on the underside of the pressing fins 11. In addition, sealing elements 20b of the contact carrier 4 are disposed below the electric connecting cables 7. By pressing the contact lid 10 onto the contact carrier 4, the seals 21, 20b are elastically shaped and, as a result, the insulation displacement connection 6 is sealed against the effects of external moisture.

FIG. 6B shows the contact carrier 4 from FIG. 6A in a top view. One can discern that a seal 20A is worked into the contact carrier 4 along the outer edge of the contact carrier 4. Recesses 35, in which the electric connecting cables 7 run, are located in the contact carrier 4. At the location of the recesses 35, the contact carrier 4 features recessed sealing elements 20b, which are also visible in FIG. 6A. The sealing elements 20a are compressed by pressing the contact lid 10 onto the contact carrier 4, thereby establishing the seal.

According to FIG. 6B, each of the insulation displacement contacts 5 is provided with blades 9 aligned with one another, which enables an insulation displacement connection 6 to be executed with increased certainty of contact, because each electric connecting cable 7 is connected to two pairs of blades 9.

FIG. 6B also shows a contact safety 32, which is depicted in the form of panels protruding upward from the contact carrier 4. After the electric connecting cable 7 has been placed into the recess 35 of the contact carrier 4, the panels are folded inward and, therefore, the electric connecting cable 7 is mechanically fastened for the purpose of relieving tensile stress.

FIG. 6B also shows a bus system 26, which is integrated into the contact carrier 4 and electrically connected to the insulation displacement contacts 5.

FIG. 6C shows the contact lid 10 from FIG. 6A in a top view. The sealing elements 21 disposed below the pressing fins 11 are visible.

FIG. 7 shows a sensor assembly, in which a sensor 27 is connected to two electric connecting cables 7, wherein the insulation displacement contacts of the sensor 27 are connected to the electric connecting cables 7.

FIG. 8 shows another sensor assembly, in which two sensors 27a, 27b are connected to an electric connecting cable 7 as well as to other electric conductors 29. The electric connecting cable 7 passes through the sensor 27a and connected to both sensor 27a and sensor 27b. As a result, a common return cable for the two sensors 27a, 27b can be realized. The supply cable is realized through an additional electric connecting cable 29, wherein each sensor 27a, 27b is connected to an additional electric conductor 29.

In addition, a cable guide 36 can be provided, which simplifies the parallel placement of the cables 7, 29.

FIG. 9 shows a sensor assembly with sensors 27a, 27b, 27c, wherein each sensor is provided with a bus system. Each sensor is connected to bus cables 30. The bus cables 30 run from sensor 27a to sensor 27b, and from there continue to sensor 27c. A dedicated bus cable 30 for each sensor 27a, 27b, 27c is not necessary. Instead, each bus cable 30 can be easily connected to multiple insulation displacement contacts of different sensors 27a, 27b, 27c.

What is claimed is:

1. A sensor comprising:
    a sensor element to detect a physical variable in a medium that surrounds the sensor element, the sensor element comprising two electric contact surfaces;
    a sensor body having a first end and a second end, the first end being connected to the sensor element; and
    a contact carrier connected to the second end of the sensor body, the contact carrier comprising insulation displacement contacts that produce an electrical connection to an electrical cable by piercing insulation on the electrical cable, the insulation displacement contacts being electrically connected to the two electric contact surfaces of the sensor element.

2. A sensor according to claim 1, wherein each insulation displacement contact comprises opposing blades disposed in a recess, the opposing blades for piercing the insulation on the electrical cable.

3. A sensor according to claim 2, further comprising:
    a contact lid that presses the electrical cable into a recess of at least one insulation displacement contact; and
    a fastener to fasten the electrical cable in the recess of the at least one insulation displacement contact.

4. A sensor according to claim 3, further comprising:
    sealing elements disposed in the contact lid and the contact carrier, the sealing elements deforming in response to mounting the contact lid onto the contact carrier, the sealing elements protecting the insulation displacement contacts from moisture.

5. A sensor according to claim 3, wherein the contact lid comprises a pressing fin to press the electrical cable into the recess; and
    wherein the fastener comprises an eye that latches into a snap hook on the contact carrier.

6. A sensor according to claim 1, wherein the insulation displacement contacts comprise contact elements that are connected to contact cables that produce electrical connection to the two electric contact surfaces of the sensor element.

7. A sensor according to claim 1, wherein the insulation displacement contacts connect to the sensor element via electrically conductive connections; and
    wherein the insulation displacement contacts and the electrically conductive connections comprise integral components of a punched panel.

8. A sensor according to claim 1, further comprising:
    a sealing cap that is pushed onto the contact carrier to protect the electrical connection from moisture.

9. A sensor according to claim 1, wherein the sensor element is disposed in a hole in the sensor body.

10. A sensor according to claim 1, wherein the sensor body comprises a flange located near the contact carrier, the flange for mounting the sensor.

11. A sensor according to claim 1, wherein the sensor body comprises a bayonet catch for securing the sensor to a housing.

12. A sensor according to claim 1, further comprising:
    a bus system that is electrically connected to the insulation displacement contacts.

13. A sensor assembly comprising:
    a plurality of bus cables; and
    a plurality of sensors according to claim 1,
    wherein a bus cable is connected to an insulation displacement contact of each sensor.

14. The sensor assembly of claim 13, wherein the physical variable comprises temperature, and wherein the electrical cable comprises an electrical connection to an electronic system of a motor vehicle.

15. The sensor of claim 1, wherein the physical variable comprises temperature, and wherein the electrical cable comprises an electrical connection to an electronic system of a motor vehicle.

16. A sensor assembly comprising:
an electrical cable; and
a plurality of sensors, each sensor comprising:
  a sensor element to detect a physical variable in a medium that surrounds the sensor element, the sensor element comprising two electric contact surfaces;
  a sensor body having a first end and a second end, the first end being connected to the sensor element; and
  a contact carrier connected to the second end, the contact carrier comprising insulation displacement contacts that produce an electrical connection to the electrical cable by piercing insulation on the electrical cable, the insulation displacement contacts being electrically connected to the two electric contact surfaces of the sensor element.

17. A sensor assembly according to claim 16, wherein each insulation displacement contact comprises opposing blades disposed in a recess, the blades for piercing the insulation and contacting the electrical cable.

18. The sensor assembly of claim 16, wherein the physical variable comprises temperature, and wherein the electrical cable comprises an electrical connection to an electronic system of a motor vehicle.

19. A sensor assembly comprising:
plural conductors, including an electrical cable; and
a plurality of sensors, each sensor comprising:
  a sensor element to detect a physical variable in a medium that surrounds the sensor element, the sensor element comprising two electric contact surfaces;
  a sensor body having a first end and a second end, the sensor element being connect to the first end; and
  a contact carrier connected to the second end of the sensor element, the contact carrier comprising insulation displacement contacts that pierce insulation to produce an electrical connection to a conductor, the insulation displacement contacts being electrically connected to the two electric contact surfaces of the sensor element;
wherein one insulation displacement contact of each sensor is connected to the electrical cable and one insulation displacement contact of each sensor is connected to a conductor other than the electrical cable.

20. The sensor assembly of claim 19, wherein the physical variable comprises temperature, and wherein the conductor comprises an electrical connection to an electronic system of a motor vehicle.

* * * * *